United States Patent
Keshavaraj

(12) 
(10) Patent No.: US 6,294,487 B1
(45) Date of Patent: Sep. 25, 2001

(54) AIRBAG FABRIC PROCESSING VERY LOW COVER FACTOR

(75) Inventor: Ramesh Keshavaraj, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/405,999

(22) Filed: Sep. 24, 1999

(51) Int. Cl.[7] .................................................. B32B 5/08
(52) U.S. Cl. .................. 442/218; 280/728.1; 428/34.3; 428/34.5; 428/34.6; 428/34.7; 428/36.1; 442/76; 442/152; 442/158; 442/164; 442/168; 442/181; 442/203
(58) Field of Search .................. 280/728.1; 428/34.3, 428/34.5, 34.6, 34.7, 36.1; 442/76, 152, 158, 164, 168, 181, 203, 218

(56) References Cited

U.S. PATENT DOCUMENTS

| | | |
|---|---|---|
| 3,792,873 | 2/1974 | Buchner et al. ............... 280/150 AB |
| 4,921,735 | 5/1990 | Bloch .................................. 428/34.9 |
| 4,944,529 | 7/1990 | Backhaus ............................ 280/743 |
| 5,087,071 | 2/1992 | Wallner et al. ...................... 280/743 |
| 5,090,729 | 2/1992 | Watanabe ............................ 280/743 |
| 5,093,163 | 3/1992 | Krummheuer et al. ............ 428/35.1 |
| 5,110,666 | 5/1992 | Menzel et al. ....................... 428/196 |
| 5,215,795 * | 6/1993 | Matsumoto et al. ................. 428/36.1 |
| 5,236,775 | 8/1993 | Swoboda et al. .................... 428/225 |
| 5,277,230 | 1/1994 | Sollars, Jr. ........................... 139/389 |
| 5,310,216 | 5/1994 | Wehner et al. .................. 280/743 R |
| 5,316,337 | 5/1994 | Yamaji et al. ................... 280/743 R |
| 5,356,680 | 10/1994 | Krummheuer et al. ............ 428/36.1 |
| 5,365,651 | 11/1994 | Rogers et al. ......................... 29/468 |
| 5,405,164 | 4/1995 | Paxton et al. ..................... 280/728 A |
| 5,407,223 | 4/1995 | Lauritzen et al. ............... 280/728 A |
| 5,423,273 | 6/1995 | Hawthorn et al. ................... 112/441 |
| 5,454,587 | 10/1995 | Halford et al. .................... 280/728.1 |
| 5,454,594 | 10/1995 | Krickl ................................ 280/743.1 |
| 5,458,364 | 10/1995 | Mueller et al. .................... 280/728.2 |
| 5,477,890 | 12/1995 | Krummheuer et al. ......... 139/291 R |
| 5,498,024 | 3/1996 | Caruso, Jr. ........................ 280/728.2 |
| 5,503,197 | 4/1996 | Bower et al. ...................... 139/435.1 |
| 5,508,073 | 4/1996 | Krummheuer et al. ............. 428/35.1 |
| 5,520,414 | 5/1996 | Bishop .............................. 280/743.1 |
| 5,533,755 | 7/1996 | Nelsen et al. ..................... 280/743.1 |
| 5,544,911 | 8/1996 | Vine .................................. 280/728.2 |
| 5,547,212 | 8/1996 | Dyer et al. ........................ 280/728.2 |
| 5,553,886 | 9/1996 | Gunn et al. ....................... 280/728.2 |
| 5,564,738 | 10/1996 | Johnson ............................... 280/736 |
| 5,564,739 | 10/1996 | Davidson ............................. 280/736 |
| 5,566,973 | 10/1996 | Green et al. ...................... 280/728.2 |
| 5,620,200 | 4/1997 | Garner et al. ..................... 280/728.2 |
| 5,652,389 | 7/1997 | Schaps et al. .......................... 73/643 |
| 5,683,100 | 11/1997 | Enders .............................. 280/728.2 |
| 5,692,777 | 12/1997 | Tochacek et al. ................. 280/743.1 |
| 5,704,402 | 1/1998 | Bowen et al. ........................ 139/289 |
| 5,709,405 | 1/1998 | Saderholm et al. ................. 280/736 |
| 5,952,250 * | 9/1999 | Kim et al. ............................ 442/203 |
| 6,220,309 * | 4/2001 | Sollars, Jr. ........................... 139/389 |

* cited by examiner

*Primary Examiner*—Elizabeth M. Cole
*Assistant Examiner*—Arti R. Singh
(74) *Attorney, Agent, or Firm*—Terry T. Moyer; William S. Parks

(57) ABSTRACT

The present invention relates to an airbag fabric which is woven in such a manner as to possess a cover factor of less than about 1900 but which simultaneously, through the presence of a film (laminate) or coating, possesses an extremely low air permeability. The utilization of such a loosely constructed fabric within airbag cushions has heretofore not been possible, even with the application of standard airbag coatings (such as silicones) over the fabric surface since such coatings with not easily remain in contact over the loosely constructed fabric surface (i.e., the coating would leak through the fabric). The coupling of a low cover factor fabric with a laminate film (or with a coating wherein the cover factor is at least 1600), however, solves such a problem and permits the utilization of inexpensively produced woven fabrics within airbag applications.

20 Claims, No Drawings

AIRBAG FABRIC PROCESSING VERY LOW COVER FACTOR

FIELD OF THE INVENTION

The present invention relates to an airbag fabric which is woven in such a manner as to possess a cover factor of less than about 1900 but which simultaneously, through the presence of a film (laminate) or coating, possesses an extremely low air permeability. The utilization of such a loosely constructed fabric within airbag cushions has heretofore not been possible, even with the application of standard airbag coatings (such as silicones) over the fabric surface since such coatings would not easily remain in contact over the loosely constructed fabric surface (i.e., the coating would leak through the fabric). The coupling of a low cover factor fabric with a laminate film (or with a high-viscosity coating wherein the cover factor is at least 1600), however, solves such a problem and permits the utilization of inexpensively produced woven fabrics within airbag applications.

BACKGROUND OF THE PRIOR ART

All U.S. patent cited herein are hereby fully incorporated by reference.

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events occurs within about 30 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop; U.S. Pat. No. 5,454,594 to Krickl; U.S. Pat. No. 5,423,273 to Hawthorn et al.; U.S. Pat. No. 5,316,337 to Yamaji et al.; U.S. Pat. No. 5,310,216 to Wehner et al.; U.S. Pat. No. 5,090,729 to Watanabe; U.S. Pat. No. 5,087,071 to Wallner et al.; U.S. Pat. No. 4,944,529 to Backhaus; and U.S. Pat. No. 3,792,873 to Buchner et al.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch; U.S. Pat. No. 5,093,163 to Krummheuer et al.; U.S. Pat. No. 5,110,666 to Menzel et al.; U.S. Pat. No. 5,236,775 to Swoboda et al.; U.S. Pat. No. 5,277,230 to Sollars, Jr.; U.S. Pat. No. 5,356,680 to Krummheuer et al.; U.S. Pat. No. 5,477,890 to Krummheuer et al.; U.S. Pat. No. 5,508,073 to Krummheuer et al.; U.S. Pat. No. 5,503,197 to Bower et al.; and U.S. Pat. No. 5,704,402 to Bowen et al.

As will be appreciated, the permeability of the cushion structure is an important factor in determining the rate of inflation and subsequent rapid deflation following the impact event. In order to control the overall permeability of the cushion, it has generally been desirable to utilize certain coatings (such as silicones) to fill the interstitial space between the individual yarns in the airbag structure, as well as to attempt to keep such yarns from shifting (and thus create larger open spaces within the fabric) during an inflation event. Thus, it has been common to utilize relatively thick coatings, comprised of such materials as silicones, for example, to reduce the permeability of such airbag fabrics. The utilization of such coatings, however, has limited the availability of different woven fabric structures as the base airbag fabric.

In order to reduce the number and amount of interstitial spaces between fabric yarn s, the woven structure has necessarily been very dense (i.e., high picks per inch of fabric and high yarn denier). Fabric density is measured in general by what is termed a "cover factor." This factor measures the product of the number of warp yarns per inch of fabric and the square root of the denier of the warp yarn all added to the product of the number of weft yarns per inch of fabric and the square root of the denier of the weft yarn. A high cover factor fabric will therefore comprise relatively high denier yarns in both warp and weft directions, all woven to a high picks per inch count. In the past, the lowest airbag fabric cover factor utilized for within any airbag applications has measured about 2000 (210 denier yarns in both directions, 69 picks/inch and 69 ends/inch=1999.8 or roughly 2000). As noted above, since air permeability is of utmost concern within airbag applications, the use of such dense fabric has been necessary, in combination with standard airbag coatings, to provide such desired low air permeabilities. If the density of such fabric were any lower, the standard coatings would not properly coat the fabric surface; most likely the coating materials would leak through the fabric and not provide any real barrier to air. Also, without the utilization or presence of coating on the surface of low cover factor (low density) airbag fabrics, the air permeability would be much too high for such fabric to function properly. The low density fabric would possess to much potential open space between individual yarns to act as a barrier to air during an inflation event. Thus, there has been no disclosure or fair suggestion in the past or within the prior art of trying to incorporate low density (low cover factor) fabrics within airbag cushions. Although such weave structures could be highly cost-effective (due to a reduction in the need for specialized, difficult weaving procedures, and lower denier yarns), again, the prior art has not accorded any instruction or mention to the ordinarily skilled artisan regarding the possible or proper utilization of such low cover factor fabrics within airbag cushions.

SUMMARY OF THE INVENTION

In view of the foregoing, it is a general object of the present invention to provide a cost-effective, low density, laminated airbag fabric for incorporation within an airbag cushion for utilization within a vehicle restraint system. The term "vehicle restraint system" is intended to mean both inflatable occupant restraining cushion and the mechanical and chemical components (such as the inflation means, ignition means, propellant, and the like). It is a more particular object of the present invention to provide an airbag fabric wherein the cover factor (density) of said airbag is below about 1900. A further object of this invention is to provide an airbag fabric which is woven by a simple, inexpensive method and laminated with a film (or coated) in a simple, inexpensive procedure. It is still a further object of this invention to provide an airbag cushion which provides an acceptable level of air permeability with a fabric which exhibits a cover factor of below about 1900.

To achieve these and other objects and in accordance with the purpose of the invention, as embodied and broadly described herein, the present invention provides an airbag fabric for incorporation within an airbag cushion comprising a woven fabric substrate, at least a portion of which is coated or laminated, wherein said woven fabric substrate has a cover factor below about 1900, and wherein the air permeability of said airbag fabric is less than about 0.5 cfm under 124 Pa pressure at about 25° C. The utilization of a coating or laminate (i.e., film) provides the desired low degree of air permeability over the covered portion of the airbag fabric. In this instance, the term "laminate" is intended to encompass a continuous film which is bonded to the fabric structure through the utilization of a bonding agent. Thus, such a bonding agent may be applied first to the fabric surface and then covered by the laminate. Or, the bonding agent may be incorporated on the side of the laminate which is to be in contact with the fabric surface. The film structure of the laminate thus differs significantly from the standard airbag coatings previously used in such applications since the laminate is continuous, must be adhered to the surface through the utilization of such a bonding agent, and is applied to the fabric as a film. Coatings generally are applied through a method in which the coating material is of very high viscosity (i.e., from about 10,000 to about 100,000 centipoise at 1 atmosphere and 25EC) and applied by a standard coating mechanism (such as a knife coater). Such coatings would only be applied to fabric substrates which possess cover factors of between 1600 and 1900 since, even though the viscosities of such coatings would be extremely high and thus allow for maximum adhesion to the individual yarns, the spaces between such yarns would be too voluminous to permit sufficient, continuous filling of such spaces too provide the necessary air permeability of fabric substrates possessing densities below about 1600.

The fabric substrate, which may be one or multiple layer construction, is preferably produced from all-synthetic fibers, such as polyesters and polyamides, although natural fibers may also be utilized in certain circumstances. The substrate must be woven in structure. Any type of weave pattern may be utilized to produce the woven structure, including, plain weave, basket weave, twill patterns, and the like, as well as balanced or unbalanced pick and end counts. Preferably, the fabric is constructed of nylon-6,6 in a plain weave pattern having a balanced construction (such as 78 picks/inch and 78 ends/inch). The individual yarns utilized within the fabric substrate must generally possess deniers within the range of from about 100 to about 840; preferably from about 100 to about 630. The woven fabrics may be produced on any type of standard loom, include air-jet, water-jet, Jacquard, dobby, rapier, and the like.

The preferred films are selected from the group consisting of polyurethane, polyamide, polyester, or any other thermoplastic polymeric materials which have a lower melting point as compared to the target airbag fabric substrate. The bonding agent is thus selected from the group of materials consisting of isocyanates, epoxies, melamines, aziridines, and mixtures of melamines with other compounds. Additionally, the bonding agent is preferably dissolved or present within any volatile solvent which evaporates quickly upon exposure to low temperatures (i.e., above room temperature). Preferably, such volatile solvents are selected from the group consisting of methyl ethyl ketone, dimethyl formamide, tetrahydrofuran, diethyl sulfoxide, n-methylpyrrolidone, and any mixtures thereof.

The total add-on weight of the laminate on the fabric surface is from about 0.6 to about 3.5 ounces per square yard; preferably, this weight is from about 1.0 to about 3.0 ounces per square yard; more preferably from about 1.5 to about 2.5 ounces per square yard; and most preferably about 2.0 ounces per square yard. The film thickness, when ultimately adhered to the fabric surface, is from about 0.1 to about 3.5 mils; preferably from about 1.0 to about 3.5 mils; more preferably from about 1.5 to about 3.0 mils; and most preferably from about 2.0 to about 3.0 mils.

The general method followed in adhering the laminate to the target airbag fabric surface comprises coating the fabric with the bonding agent; laminating the desired film to at least a portion of the treated fabric by running the fabric through a heated nip roll including the to-be-applied film; and heating the resultant composite to a bonding temperature of between about 270 and 450EF; more preferably from about 290 to about 400E; most preferably from about 300 to about 350EF. This high temperature effectuates the desired bonding of the film to the fabric surface through the melting of the film materials which then deform to meet the contours and dimensions of the fabric surface. Upon cooling the adhered, deformed film retains its structural integrity as a laminate over the entire treated fabric surface, which fills the spaces between the loosely packed yarns. The laminate is flexible enough to permit sufficient inflation upon a collision event to provide a cushion to a passenger or driver; however, the film also exhibits a rigidity over the individual yarns such that the yarns do not much appreciably from their set woven pattern. As such, the laminate, in filling the interstitial spaces between the yarns as well as preventing movement of the yarns from their set pattern, thus provides the airbag fabric (and consequently the airbag cushion) with a remarkably reliable manner of reducing air permeability through the fabric structure. Such a novel procedure thus accords the artisan with a manner of utilizing inexpensively produced fabric exhibiting a low cover factor (below about 1900) to produce an effective airbag fabric and cushion for utilization within a vehicle restraint system.

Possible coatings include those comprising the same materials as noted for the films above (polyurethanes, polyacrylates, and the like), which are formulated to a viscosity of between about 10,000 and 100,000 centipoise at 1 atmosphere and 25° C., as noted above. Such coatings would be added to the target fabric substrate surface through any standard procedure, include knife coating, and the like. Again, such possible coatings would only be useful on higher density fabrics possessing cover factors from about 1600 to about 1900.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

PREFERRED EMBODIMENT OF THE INVENTION

The Examples below are indicative of the particularly preferred embodiment within the scope of the invention:

EXAMPLE 1

A fabric substrate was produced having a cover factor of about 1560 was produced on a water-jet loom. This fabric comprised nylon-6,6 yarns having deniers of about 100 packed together to form 78 picks/inch and 78 ends/inch. The woven fabric was then coated with a common isocyanate bonding agent, in an amount of about 0.6 ounces per square yard of fabric. A film of polyurethane having about 2–3 mils average thickness was then laminated to the surface of the treated fabric substrate and heated to a temperature of about 325° F. The composite was then allowed to cool and was then tested for its air permeability at 124 Pa at about 25° C. Such permeability was measured to be 0.

EXAMPLE 2

A fabric substrate was produced having a cover factor of about 1594 was produced on a water-jet loom. This fabric comprised nylon-6,6 yarns having deniers of about 210 packed together to form 55 picks/inch and 55 ends/inch. The woven fabric was then coated with a common isocyanate bonding agent, in an amount of about 0.6 ounces per square yard of fabric. A film of polyurethane having an average thickness of 2–3 mils was then laminated to the surface of the treated fabric substrate and heated to a temperature of about 325° F. The composite was then allowed to cool and was then tested for its air permeability under 124 Pa at about 25° C. Such permeability was measured to be 0.

EXAMPLE 3

A fabric substrate was produced having a cover factor of about 1597 was produced on a water-jet loom. This fabric comprised nylon-6,6 yarns having deniers of about 315 packed together to form 45 picks/inch and 45 ends/inch. The woven fabric was then coated with a common isocyanate bonding agent, in an amount of about 0.6 ounces per square yard of fabric. A film of polyurethane having an average thickness of about 2–3 mils was then laminated to the surface of the treated fabric substrate and heated to a temperature of about 325° F. The composite was then allowed to cool and was then tested for its air permeability under 124 Pa at about 25° C. Such permeability was measured to be 0.

EXAMPLE 4

A fabric substrate was produced having a cover factor of about 1476 was produced on a water-jet loom. This fabric comprised nylon-6,6 yarns having deniers of about 420 packed together to form 36 picks/inch and 36 ends/inch. The woven fabric was then coated with a common isocyanate bonding agent, in an amount of about 0.6 ounces per square yard of fabric. A film of polyurethane having an average thickness of about 2–3 mils was then laminated to the surface of the treated fabric substrate and heated to a temperature of about 325° F. The composite was then allowed to cool and was then tested for its air permeability under 124 Pa at about 25° C. Such permeability was measured to be 0.

EXAMPLE 5

A fabric substrate was produced having a cover factor of about 1375 was produced on a water-jet loom. This fabric comprised nylon-6,6 yarns having deniers of about 525 packed together to form 30 picks/inch and 30 ends/inch. The woven fabric was then coated with a common isocyanate bonding agent, in an amount of about 0.6 ounces per square yard of fabric. A film of polyurethane having an average thickness of 2–3 mils was then laminated to the surface of the treated fabric substrate and heated to a temperature of about 325° F. The composite was then allowed to cool and was then tested for its air permeability under 124 Pa at about 25° C. Such permeability was measured to be 0.

EXAMPLE 6

A fabric substrate was produced having a cover factor of about 1305 was produced on a water-jet loom. This fabric comprised nylon-6,6 yarns having deniers of about 630 packed together to form 26 picks/inch and 26 ends/inch. The woven fabric was then coated with a common isocyanate bonding agent, in an amount of about 0.6 ounces per square yard of fabric. A film of polyurethane having an average thickness of 2–3 mils was then laminated to the surface of the treated fabric substrate and heated to a temperature of about 325° F. The composite was then allowed to cool and was then tested for its air permeability under 124 Pa at about 25° C. Such permeability was measured to be 0.

EXAMPLE 7

A fabric substrate was produced having a cover factor of about 1844 was produced on a Jacquard loom. This fabric comprised nylon-6,6 yarns having deniers of about 420 packed together to form 46 picks/inch and 46 ends/inch. The woven fabric was then coated with a common isocyanate bonding agent, in an amount of about 0.6 ounces per square yard of fabric. A coating of polyurethane possessing an average viscosity of roughly 20,000 centipoise at 1 atmosphere and at 25° C. was then applied to the surface of the treated fabric substrate and heated to a temperature of about 325° F. The composite was then allowed to cool and was then tested for its air permeability under 124 Pa at about 25° C. Such permeability was measured to be 0.

While specific embodiments of the invention have been illustrated and described, it is to be understood that the invention is not limited thereto, since modifications may certainly be made and other embodiments of the principals of this invention will no doubt occur to those skilled in the art. Therefore, it is contemplated by the appended claims to cover any such modifications and other embodiments as incorporate the features of this invention which in the true spirit and scope of the claims hereto.

What I claim is:

1. An airbag fabric for incorporation within an airbag cushion comprising a woven fabric substrate, at least a portion of which is coated or laminated, wherein said woven fabric substrate has a cover factor below about 1900, and wherein the air permeability of said airbag fabric is less than about 0.5 cfm under 124 Pa pressure at about 25° C.

2. The airbag fabric of claim 1 wherein said woven fabric substrate is coated or laminated with a coating or film selected from the group consisting of polyurethane, polyacrylate, polyamide, polyester, and copolymers thereof.

3. The airbag fabric of claim 1 wherein said cover factor below about 1800.

4. The airbag fabric of claim 3 wherein said cover factor below about 1775.

5. The airbag fabric of claim 4 wherein said cover factor below about 1750.

6. The airbag fabric of claim 5 wherein said coating or laminate comprises polyurethane.

7. The airbag fabric of claim 6 wherein the thickness of said coating or laminate is from 0.1 to about 3.5 mils.

8. An airbag cushion comprising the airbag fabric of claim 6.

9. An airbag cushion comprising the airbag fabric of claim 7.

10. The airbag fabric of claim 4 wherein said coating or laminate comprises polyurethane.

11. The airbag fabric of claim 10 wherein the thickness of said coating or laminate is from 0.1 to about 3.5 mils.

12. An airbag cushion comprising the airbag fabric of claim 11.

13. An airbag cushion comprising the airbag fabric of claim 10.

14. The airbag fabric of claim 3 wherein said coating or laminate comprises polyurethane.

15. The airbag fabric of claim 14 wherein the thickness of said coating or laminate is from 0.1 to about 3.5 mils.

16. An airbag cushion comprising the airbag fabric of claim 15.

17. An airbag cushion comprising the airbag fabric of claim 14.

18. The airbag fabric of claim 1 wherein the thickness of said coating or laminate is from 0.1 to about 3.5 mils.

19. An airbag cushion comprising the airbag fabric of claim 18.

20. An airbag cushion comprising the airbag fabric of claim 1.

* * * * *